United States Patent
Cranford, Jr. et al.

(10) Patent No.: US 7,916,820 B2
(45) Date of Patent: Mar. 29, 2011

(54) SYSTEMS AND ARRANGEMENTS FOR CLOCK AND DATA RECOVERY IN COMMUNICATIONS

(75) Inventors: Hayden C. Cranford, Jr., Cary, NC (US); Daniel J. Friedman, Sleepy Hollow, NY (US); Mounir Meghelli, Tarrytown, NY (US); Thomas H. Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 11/608,962

(22) Filed: Dec. 11, 2006

(65) Prior Publication Data

US 2008/0137790 A1 Jun. 12, 2008

(51) Int. Cl.
*H04L 7/00* (2006.01)
(52) U.S. Cl. ........ 375/357; 375/260; 375/359; 375/371; 375/375; 375/376; 370/503; 370/509
(58) Field of Classification Search ................. 375/293, 375/260, 294, 327, 342, 354, 355, 359, 371, 375/375, 376, 259, 267, 295, 357
See application file for complete search history.

(56) References Cited

U.S. PATENT DOCUMENTS

| | | | |
|---|---|---|---|
| 6,711,226 B1 | 3/2004 | Williams et al. | |
| 6,950,484 B1 | 9/2005 | Jordan et al. | |
| 7,409,031 B1 * | 8/2008 | Lee et al. | 375/376 |
| 7,471,755 B2 * | 12/2008 | Carballo | 375/355 |
| 7,532,697 B1 * | 5/2009 | Sidiropoulos et al. | 375/376 |
| 7,738,617 B1 * | 6/2010 | Fortin et al. | 375/373 |
| 7,813,381 B2 * | 10/2010 | Chang et al. | 370/503 |
| 2003/0007585 A1 * | 1/2003 | Dalton et al. | 375/376 |
| 2003/0107418 A1 | 6/2003 | Chang et al. | |
| 2004/0260493 A1 | 12/2004 | Richmond | |
| 2006/0250192 A1 * | 11/2006 | Hsieh | 331/16 |
| 2008/0056426 A1 * | 3/2008 | Si et al. | 375/373 |
| 2008/0130891 A1 * | 6/2008 | Sun et al. | 380/268 |

* cited by examiner

*Primary Examiner* — Shuwang Liu
*Assistant Examiner* — Hirdepal Singh
(74) *Attorney, Agent, or Firm* — Ian D. MacKinnon; Schubert Law Group PLLC

(57) ABSTRACT

A dual mode clock and data recovery (CDR) system is disclosed. A fast locking, oversampling CDR acquisition module can begin the process to quickly create a data acquisition clock signal in start up data acquisition conditions. When at least some data can be extracted from the incoming data stream, the CDR system can indicate such stability and switch to accept control from a low power CDR maintenance module. The low power CDR maintenance module can then fine tune and maintain the timing of the data acquisition signal. If the quality of the data lock under CDR maintenance module control degrades to a sufficient degree, the high power CDR acquisition module can be re-enables and re-assert control from the low power module until such time as the lock quality is again sufficient for the low power module to be used.

17 Claims, 4 Drawing Sheets

SYSTEMS AND ARRANGEMENTS FOR CLOCK AND DATA RECOVERY IN COMMUNICATIONS

FIELD OF INVENTION

The present disclosure is in the field of communications systems and more particularly in the field of clock and data recovery systems.

BACKGROUND

Communication systems typically utilize some form of clock system to synchronize communications between a transmitter and a receiver. In digital communication systems, the receiver typically operates at or near the same average frequency as the transmitting end to prevent loss of information. When digital signals are transported over a network of digital communication links, switching nodes, multiplexers, and transmission line interfaces, the task of keeping all the entities operating at the same average frequency is referred to as network synchronization.

Generally, in gigabit/second communication systems it is important that a receiver reads or samples the data waveform at an appropriate point in time relative to data waveform transitions. Many techniques can be utilized to determine when to sample the data waveform and this process is generally referred to as clock and data recovery (CDR). In a CDR system, when the timing of the receiver is synchronized with the data stream or data waveform, a sampling clock of the receiver will trigger a receiving component, such as a latch, a flip-flop or a register to acquire the logic value provided by the waveform at an appropriate time.

Applications for clock and data recovery abound in all facets of telecommunications, optical transceivers, data and storage networks, wireless products and computing systems in general. Traditional CDR systems utilize two or more system clocks or two sampling clock signals that cycle every bit interval or bit cycle. This "oversampling" approach is commonplace in typical CDR applications.

It can be appreciated that while the traditional oversampling topology in CDR systems is an effective way to recover data on a serial communication line, such a topology can be a costly and inefficient way to recover such data. Specifically, many CDR systems are typically required in a single integrated circuit system and each clock and associated clock distribution network required in such oversampling circuits typically consume a significant amount of power and further take up significant and valuable space on an integrated circuit. In such typical realizations of CDR systems, the first and second clocks together are typically utilized to sample the incoming waveform at different times, generally each signal initiating one sample per bit cycle. In this architecture, one of the two clocks typically sets when the data waveform is sampled for data acquisition while the other clock, along with the sampling clock, typically provides timing adjustment information to maintain synchronization between the incoming data stream and the CDR system.

CDR systems generally operate plesiochronously, where a transmitter clock operates at a "known" frequency and the receiver clock operates at a frequency within a small frequency offset of the transmitter clock's frequency. Plesiochronous operation occurs generally where critical timing moments occur nominally at the same rate and any variation in rate is constrained within specified limits. Although the frequency of the sampling clock can be set based on the frequency of the transmitter clock, unknown delays can occur between the transmitter and the receiver.

In addition, the timing of the received waveform can undergo random changes, known as timing jitter, which are induced by non-idealities of the clock circuitries and the transmission path. Furthermore, the presence of even small offsets between transmitter and receiver base frequencies will result in continuous changes in the relative phase between transmit and receive clock signals. Hence, the sample time(s) as determined by a data acquisition clock needs to be dynamically determined by the receiver in order to accurately recover data from the transmitted data waveform.

Ideally, clock and data recovery circuitry can perform voltage detection and set "phase slicing" levels in relation to a center of a pulse or a position between consecutive transitions of a differential signal. A differential signal has two signals that are one hundred eighty degrees out of phase and each signal can be carried on a separate conductor. These signals are often labeled as a data signal and a complementary data signal. Since the signals are 180 degrees out of phase, when data is being transmitted the signal on the data line will have the opposite value of the signal on the complementary data line.

It can be appreciated that signals cannot transition instantaneously and particularly in high speed gigabit/second communications signals, the time interval that the signal stays at its steady state may be shorter than the time required for the signal to transition, and thus, when certain bit patterns are present, the data waveform at the receiver can look more like a sine wave than a square wave. Accordingly, a picture of a differential signal often looks like two opposing sinusoidal waves that cross at an average voltage on the graph at various intervals, depending on the bit pattern being transmitted.

Recent advances in CDR systems have implemented additional circuits that can determine the center of the eye diagram, and/or utilize this data to determine a preferred time to sample the data stream. As stated above, virtually all of these designs have multiple system clocks and other control circuitry and such systems draw a significant amount of power and take up a lot of valuable space on an integrated circuit. Although these configurations do improve bit error rates, the penalty paid in power and size to realize the benefits provided by such circuits can be considerable.

As stated above, many CDR systems synchronize to the incoming data waveform by using two (or more) sampling clocks to detect the timing of waveform transitions on two differential data lines. One of these clocks also typically serves to sample the data waveform once per bit cycle, but not necessarily at a point in time a half-cycle removed from the times at which transition boundaries occur in the data waveform. Thus, data is acquired from the transmission line during a distinct time interval when the sampling clock is active. Clock generation and distribution circuits are among the biggest power consumers in an integrated circuit implementing a high data rate CDR. More particularly, clock circuits utilized in data receiving circuits are very "power hungry" because they typically have the highest operating frequency in a specific circuit.

The overall and relative phase precision of these multiple clocks must be accurate, demanding the use of complex, high power phase generation circuits. These circuits include delay-locked-loops (DLLs), phase-locked loops (PLLs), and phase rotator type clock generator circuits. Furthermore, the distribution of such high frequency clocks from, for example, a central clock generator to the receiver macro where the clocks are used, also demands significant power. Therefore, reducing the number of high frequency clocks that must be generated and for which precise phase relationships must be maintained is highly desirable.

Due to the significant shortcomings of traditional CDR systems as mentioned above, many low power CDR systems that have reduced clocks and clock networks have been proposed and investigated by many. CDR systems with reduced clock hardware can require significantly longer data acquisition times on power up and such systems can easily loose a data lock when noise, timing and other aberrations are present on the data line. Generally, such low power designs have a greatly reduced tracking capability for the initial timing and for changes in timing of the of the incoming data waveform. The unreliability, limited acquisition bandwidth and limited tracking bandwidth and general instability of such low power clock systems have kept such low power designs from becoming an acceptable solution to traditional CDR systems. Thus, it may be necessary provide an environment where the tracking capability of the CDR system can exceed the loop variations.

Currently, communication or information systems are transmitting and receiving data in the gigabit per second range. Increasing the accuracy of CDR amidst noise and distortions often present on a transmission line is a formidable task because the time intervals between signal transitions can become very small, demanding extreme precision of the data acquisition clock. As stated above, clock generation and distribution in CDR circuits is one of the biggest contributors to power consumption. Thus, a high precision, low power CDR architecture would be desirable.

SUMMARY OF THE INVENTION

The problems identified above are in large part addressed by the systems, arrangements, methods and media disclosed herein to provide, in one embodiment, a dual mode clock and data recovery (CDR) system. Accordingly, a sampling clock signal for a receiver of digital data can be generated by a first CDR acquisition circuit in a first mode, and after a data lock is achieved, the sampling clock signal can be provided by a low power maintenance clock circuit in a second mode. This dual mode CDR system is suitable for low power CDR applications that operate in the multi-gigabit/second range.

In one embodiment, in the first mode an oversampling CDR acquisition module can be engaged to acquire the initial data lock on the incoming data waveform. Once a lock has been achieved, (or some data has been accurately received) the job of maintaining data lock can be assumed by the secondary maintenance CDR module. Typically, the oversampling CDR would be realized as a high bandwidth loop, and particularly as a wide acquisition bandwidth loop. As the power associated with the oversampling CDR will typically be higher than that of the maintenance CDR, once a lock has been achieved, the dual mode CDR system can transfer data recovery responsibility to the maintenance CDR and preferably turn off all elements of the acquisition CDR module that are not required by the maintenance CDR module.

The low power CDR maintenance module can then fine tune the timing of the data acquisition signal, possibly with a reduced tracking bandwidth as compared to the oversampling CDR system. If a maintenance loop in the CDR maintenance module loses its data lock or detects that it is in danger of losing its data lock in the course of operation, the CDR acquisition module could be restarted and carry the system clock until a stable data lock has been reestablished, at which time the CDR maintenance module could again take over. The quality of the initial lock provided by the acquisition CDR can vary from what is minimally required for the maintenance loop to complete lock acquisition all the way to an optimized condition.

It is also contemplated that the oversampling CDR used for initial data lock acquisition could in turn have in turn its own secondary frequency acquisition loop, as will be well-understood by those familiar with the relevant state of the art. The purpose of this loop, as is well-described in prior art literature, is to enable the oversampling CDR to be activated only when the difference between the CDR's operating frequency and the incoming data stream's operating frequency is sufficiently small that the CDR will lock when control is passed from the frequency acquisition loop to the CDR.

Once the CDR acquisition module, acting with or without the assistance of a secondary frequency acquisition loop, has enabled the dual mode system to come within a predetermined data reception performance specification (referred to herein as a data lock), operation of the dual mode system can change from the acquisition mode to the low power maintenance mode. The low power maintenance mode can utilize a single clock with a feedback loop to adjust the timing of the data acquisition clock. The feedback can be based on trends of the incoming waveform such that fine tuning of the timing of the data acquisition clock can be achieved. Such a trend based timing control system can achieve equivalent or improved data error rates over traditional CDR systems utilizing a fraction of the power required by the traditional CDR systems.

In one embodiment, a method for receiving data in a CDR application is disclosed. A data lock detector can monitor a receiver for an indication of a data lock condition. A multi-clock module can be activated in response to an unconfirmed data lock condition such that the multi-clock module can acquire a plurality of data waveform samples and quickly provide a data acquisition clock that facilitates a data lock. The signal(s) controlling the transition from an acquisition/oversampling mode to maintenance/reduced sampling mode can be provided in an open loop manner, as by waiting a predetermined, potentially controllable amount of time for the system to achieve lock and initiating the transition of modes regardless of the detection of a lock condition. Alternately, the transition control signal(s) can be determined in a closed loop manner. In one closed loop embodiment, the mode transition can occur based on measuring the quality of the lock achieved using bit error rate measurements (if a known test pattern can be provided). In a second embodiment, statistical and/or margin information from the oversampling CDR could be utilized to detect a data lock condition. In this embodiment knowledge about system data rates could be determined utilizing configuration controls and access to the reference clock or reference clock-derived input could also be utilized to determine a data lock condition.

In one embodiment, the CDR loops can be realized using a dedicated CDR PLL. In an alternate embodiment, the CDR loops can be realized using a fixed frequency PLL coupled with a flexible phase generation circuit. One example of such a circuit is a phase rotator, which in a typical implementation accepts clocks with given input phases and provides at its output a complementary clock at a phase derived from a weighted combination of the input phases. The phase rotator can be controlled using analog or digital signals. A function of the receiver logic is to update the phase rotator control for clock recovery purposes.

The clock data recovery circuitry will update rotator control settings to enable the overall system to track the incoming data stream and maintain data lock. This behavior is typically accomplished by the CDR state machine, which processes input data stream samples, using these to determine phase rotator control updates. In a typical implementation, the state machine contains an up/down counter running on the appropriate clock to perform this function. In the case of a typical 2× oversampling CDR, in which two data samples are acquired per bit period, the logic continually updates the rotator to keep one sampling clock at the center of the data eye and the other sampling clock at the data transition point. Data lock in this type of system is indicated when sampling clock is continually adjusted to remain in the center of the data.

In one embodiment, the data lock indication can be based on when a determined or actual data or bit error rate is lower than a predetermined bit error rate. Once such a data lock condition is determined and the maintenance CDR module takes over the "high performance" but "power hungry" multi-clock module can be placed in an idle state, excluding any circuit portions that may be leveraged in the maintenance state. The single clock module may operate continuously or whenever an input waveform is present. However, based on power considerations and a desire to operate a minimal number of clocks concurrently the single clock module may remain idle until a lock is achieved by the acquisition module. Due to the relatively slow feedback loop of the single clock module it will most likely be slower to achieve a data lock condition than the CDR acquisition module. Thus, anytime a data lock is lost, the multi-clock module can be activated to assist the single clock module in re-achieving data lock.

In another embodiment, a clock and data recovery apparatus is disclosed. The apparatus can include a clocked receiver component such as a latch to receive a data waveform and a data acquisition clock and can produce recovered data by sampling the data waveform in response to the data acquisition clock. A multiphase clock-data acquisition module can be coupled to the clocked receiver component and provide the data acquisition clock to the clocked receiver based on sampling the data waveform at a frequency at least two times the incoming data rate. The apparatus can also include a data lock detector to determine when the data acquisition clock of the multiphase clock-data acquisition module is synchronized with the data waveform such that the recovered/received data has a predetermined accuracy or bit error rate. In addition, a clock mode switch can deactivate at least a portion of the multiphase clock-data acquisition module and activate a single clock-data acquisition module to provide a data acquisition clock to the clocked receiver component.

The sampling of the data waveform with the multiphase clock-clock acquisition module can quickly provide a data acquisition clock so that the data sample acquisition clock signal is centered within the bit cycle. The CDR system can then reconstruct the data stream on the transmission line. After some reconstructed data is acquired, the single clock module can be synchronized with the incoming data stream based on a timing signal possibly from the data acquisition clock of the multiphase clock. In a low power maintenance mode, a single clock from a single clock module can be utilized to sample the data waveform and to provide the data acquisition clock to the receiver. The single clock can continuously fine tune the data acquisition sampling position while maintaining lower power operation so that acceptable bit error rates can still be achieved.

In another embodiment, a clock and data recovery system is disclosed. The system can include a transmitter to transmit a data waveform, a receiver having data recovery module to acquire a timing of the data waveform in a start-up data acquisition mode and a second clock recovery module to fine tune a timing relationship between a data acquisition clock and a data stream based on attributes of the data waveform. The system can also include a data lock indication to control when to receiver is switched to the power conservation mode. In one embodiment the data recovery module can sample at crossovers in the data pattern and the single clock system can identify bit patterns of the data waveform based on the samples and acquire time-amplitude samples to generate a clock modification signal in response to detection of the at least one predetermined bit pattern and an analysis on the acquire time-amplitude samples.

Accordingly, the above disclosed dual mode low power clock system can be utilized by a CDR system to acquire clock and data timing over a communication link and to adjust the timing of a sample clock such that the bit error rate of a communication system will remain low when in a low power consumption mode. The multi-clock mode can have a low duty cycle or "active" period such that the system disclosed can consume less clock power than that required by traditional CDR systems. Additionally, a low overall system bit error rates are preserved.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Figure 1:
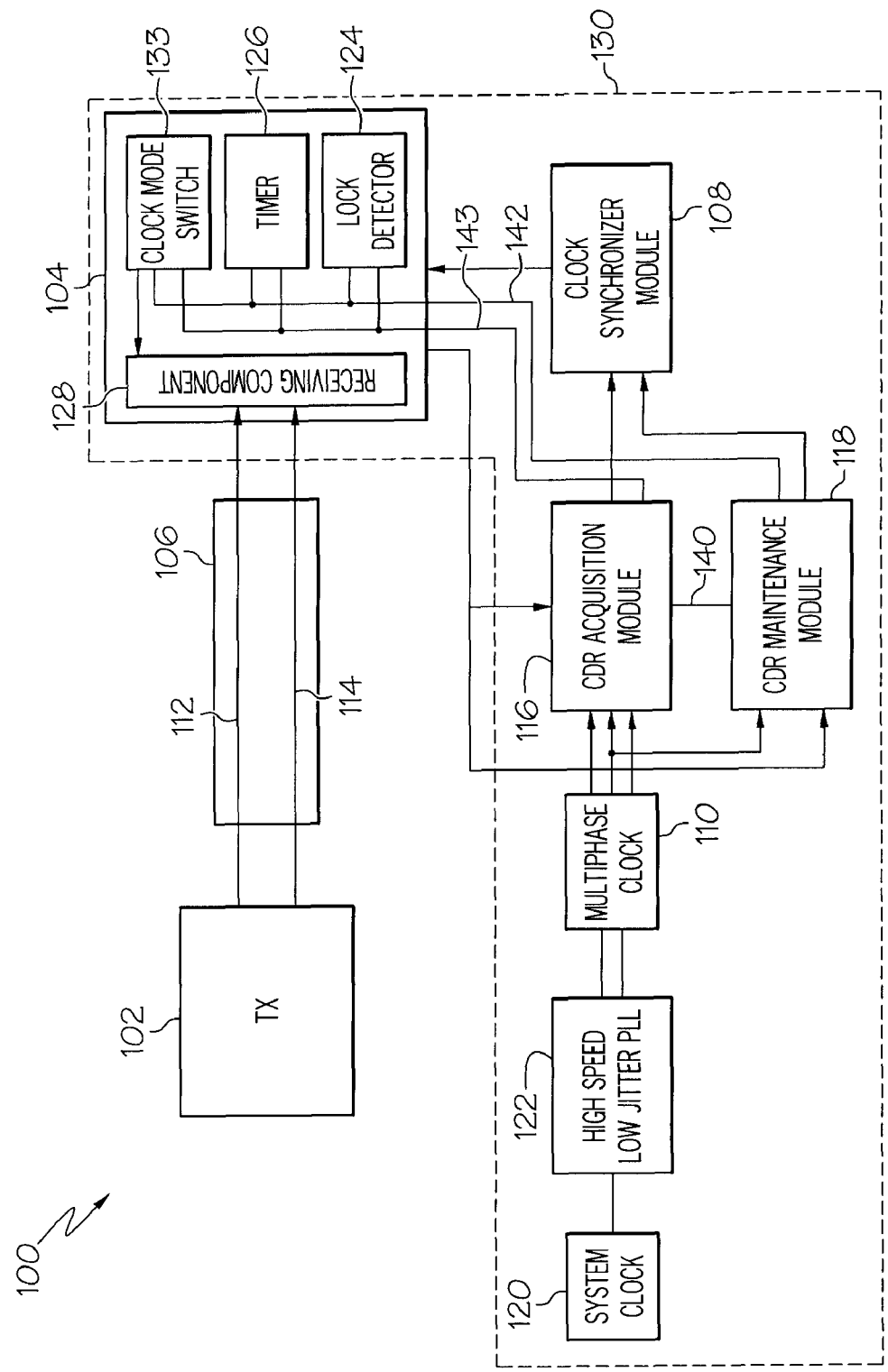
FIG. 1 illustrates a block diagram of a communication system with a dual clock and data recovery modules.

Referring to FIG. 1, a communication system 100 is illustrated. The communication system 100 can include a transmitter 102, a receiver 104 and an impedance controlled transmission line 106 interconnecting the transmitter 102 to the receiver 104. The transmission line 106 can carry differential data that has a data line 112 and a complementary data line 114 such that when one line provides a logic high value the other line provides a logic low value and vise-versa. The transmission line 106 could also carry "single ended data" on a single conductor and the transmitter 102 and the receiver 104 could communicate utilizing such a single conductor.

The dashed box 130 illustrates CDR components that could be integrated as part of the receiver 104 and on the same integrated circuit as the receiver, although these CDR components are shown independently herein for description purposes. In one embodiment, the transmitter 102 and receiver 104 can exchange data at rates in excess of three gigabits/second. At such high data rates, accurate reading of the data typically requires the receiver 104 to synchronize with the incoming data waveform such that the data stream can be accurately sampled.

The transmission line 106 or serial communication channel, as it is often called, can be one of, or a combination of, traces or strip lines of a printed circuit board. The transmission line 106 can also include backplane wiring, many types of cable or cabling, and can include a variety of connectors to interconnect the transmitter 102 to the receiver 104. The transmission line 106 can provide impedances that are matched to the input and output impedance of the transmitter 102 and the receiver 104 such that noise on the transmission line 106 is minimized and the power and integrity of the signal is not significantly degraded as it travels over the transmission line 106.

In accordance with the present disclosure, in a start up mode, the multi-clock CDR acquisition module 116 can acquire multiple time-amplitude samples during each cycle of the data stream transmitted by the transmitter 102. The CDR acquisition module 116 can even oversample the data stream or waveform to quickly detect the data stream's timing and produce a synchronized data acquisition clock signal to the receiving component 128. One drawback for a high performance, fast lock, multi-gigahertz, multi-phased clock and data acquisition module (116) that over-samples the data waveform is that it will generally consume a significant amount of power.

Thus, the system 100 can be designed such that the CDR acquisition module 116 has a very short operating time and the low power CDR maintenance module 118 can take over after the CDR acquisition module 116 achieves some predetermined level of near or actual data lock. Alternately, data recovery responsibility could be switched from the acquisition module to the maintenance module via an open loop control scheme, such as waiting a predetermined amount of time and then activating the clock mode switch 133. The CDR acquisition module 116 can also be shut down whether it acquires a data lock or does not acquire a data lock, for example as part of a thermal management scheme.

The receiver 104 can perform clock and data recovery (CDR) with the assistance of system clock 120, phase locked loop 122, multiphase clock 110, a CDR acquisition module 116, a CDR maintenance module 118, and a clock synchronizer module 108. The receiver 104 can include a data lock detector 124, a receiving component 128 such as a latch, a clock mode switch module 133, and a timer 126.

The CDR acquisition module can receive multiple clock signals from the multiphase clock 110 and the CDR maintenance module 118 can receive at least a single clock signal and optionally all clock signals from the multiphase clock 110. Thus, the same basic clock structure of the multiphase clock 110 can drive multiple clock signals to the CDR acquisition module 116 during an acquisition mode, and then during a maintenance mode the multiphase clock 110 can output a single clock signal to the CDR maintenance module 118. After the multiphase clock 110 transitions from a multiple signal output mode to a single clock signal output mode the multiphase clock 110 can place a portion of its internal circuits in an idle mode to conserve power.

It can be appreciated that the system 100 can achieve a power savings by reducing the number of clocks signals that have to be generated and distributed during the maintenance mode. Further, less integrated circuit area will be required to implement the system 100 when components can be shared between the CDR acquisition module 116 and the CDR maintenance module 118. Additionally, a significant savings in power dissipation can be achieved if the same clock circuitry in the multiphase clock 110 can be utilized by both the CDR acquisition module 116 and the CDR maintenance module 118.

As stated above, the output of one of the clocks from the multiphase clock 110 during oversampling in the start-up mode/acquisition mode can be the same clock that provides a clock signal to the CDR maintenance module 118 during the maintenance mode. This can assure a seamless transition between the acquisition mode and the maintenance mode even if the system 100 repeatedly goes in and out of data lock. In one embodiment, the multiphase clock 110 can provide more than one clock to the CDR maintenance module 118 but can provide a reduced phase count clock during operation of the CDR maintenance module 118.

The data acquisition clock, as created by the CDR maintenance module 118 and the CDR acquisition module 116, can be sent to the lock detector 124, the timer 126 and the clock mode switch 133 via conductors 142 and 143. Many different types of signals could be communicated over conductors 142 and 143. For example, data and/or edge sample information, a modified clock signals etc. Such signals allow the lock detector to detect a lock, and to switch the clock mode switch 133 to apply the proper data acquisition clock signal to the receiving component 128 based on the mode of the system 100. In one embodiment the CDR acquisition module 116 can communicate directly with the CDR maintenance module 118 via connection 140 such that the CDR maintenance module 118 can synchronize with the CDR acquisition module 116 before the system switches from CDR acquisition mode to CDR maintenance mode. Connection 140 may optionally include control as well as clock signals. Such clock signals may include clock phases derived by the acquisition module or phases from the multiphase clock that are passed through various modules.

The lock detector 124 can be connected to the output(s) of the CDR acquisition module 116 and the CDR maintenance module 118 such that an indicator of a data lock condition could be determined by the lock detector 124. The indicator and a clock mode switch position could be based on a signal from one of or both of the CDR acquisition module 116 or the CDR maintenance module 118.

Generally, more operating clock signals implies more clock distribution infrastructure and potentially more clocked loads (such as latches), requirements which lead to increased power consumption. Further, each clock transition and latch transition consumes power. This power consumption is typically highest in the blocks responsible for processing samples at the input data rate. Generally the receiver 130 can demultiplex the recovered data stream utilizing lower rate parallel data streams such that the data can be processes. Power consumption increases with increasing clock signal frequencies and with the number of samples that are taken per incoming bit cycle. Further increased speeds in the feedback loops of the CDR acquisition module 116 typically increase power consumption.

Thus, after CDR acquisition module 116 has provided a data acquisition clock signal to the receiver device 128 that allows the receiver device 128 to acquire a data or possibly a data lock, the CDR maintenance module 118 (which operates on a fraction of the power required by the CDR acquisition module 116) can be "switched" into the system and the "power hungry" CDR acquisition module 116 can be turned off (in part or in entirety) or put in a stand by state where is draws only minimal power. In maintenance mode, the base frequency of the clock signals will not change, but power can be saved by virtue of the reduction in the number of samples taken per incoming bit coupled with a potential reduction in the speed of the feedback loops operating in the CDR once it has entered maintenance mode.

Generally, the data sampling clock provided by either the CDR acquisition module 116 or the CDR maintenance module 118 allows a digital data to be acquired from the data stream because the data stream can be read or sampled at an "optimal" time. Both modules can continually improve timing of the data acquisition clock to increase the accuracy of the received data and reduce the bit error rate of the communication. In the maintenance/low power mode, clock distribution within the CDR block and to the receiver block 104 is reduced, thus reducing power consumption while enabling system performance to be maintained, albeit potentially with reduced data tracking bandwidth.

The actual start up and hand-off procedure can be implemented in many ways. In one embodiment both the CDR acquisition module 116 and the CDR maintenance module 118 can be powered up, and if the CDR maintenance module 118 can create a clock signal that achieves a data lock, then the CDR acquisition module 116 can be shut off, or can be placed in an idle mode. When, or if, the receiver 104 loses a data lock as determined by lock detector 124, then the CDR acquisition module 116 could be activated to quickly return a data lock status back to the receiver 104. In one embodiment, when the CDR acquisition module 116 is operating, the CDR acquisition module 116 can provide synchronization or timing information to the CDR maintenance module 118 such that the transition between the CDR acquisition module 116 providing the data sampling clock to the receiver component 128 and the CDR maintenance module 118 providing the data sampling clock to the receiver component 128 is seamless.

As stated above, information, possibly including timing information, can be sent directly between CDR acquisition module 116 and the CDR maintenance module 118 utilizing timing synchronization connection 140. In another embodiment, the clock synchronizer module 108 can manage the seamless transition between which module (i.e. 116 and 118) is powered and which module 116 and 118 is providing the data clock acquisition signal to the receiver component 128. In another embodiment, the power-up/power down procedure of the CDR acquisition module 116 and the CDR maintenance module 118 can be controlled by the data lock detector 124 and can be based solely on whether the receiver 104 is in data lock or has a achieved a data lock condition.

In another embodiment, the timer 126 can utilize the clock signal from either the CDR acquisition module 116 or the CDR maintenance module 118 and count to a predetermined number of cycles. When such a predetermined number of cycles occur, the timer 126 can switch the mode of the system. For example, the timer 126 could switch the data acquisition clock output from the CDR maintenance module 118 to the receiving component 128 and after the predetermined number of cycles, the timer could switch the data acquisition clock provided by the CDR maintenance module 118 to the receiving component via the clock mode switch 133 in accordance with a maintenance mode.

In another embodiment, the timer 126 could use an externally generated clock signal, such as an input reference clock for an on-chip PLL, and count cycles of the input reference clock and in turn, request the clock mode switch 133 to switch from the acquisition mode to the power saving mode after a predetermined time period. For example, a specific time after a power up of the CDR acquisition module 116 it can be assumed that a data lock will occur or be achieved by the CDR acquisition module 116 and the timer 126 can switch in the CDR maintenance module 118 and switch out the CDR acquisition module 116 at this predefined time. In one embodiment, the data lock detector 124 can determine an indicator that the data acquisition clock provided by the CDR acquisition module 116 or multi-phase CDR module is synchronized with the data waveform to within a capture range of the maintenance CDR loop.

In one embodiment, sequences of edge and data samples from the CDR acquisition module can be analyzed by a logic macro (that could be realized within the lock detector block 124) to identify whether the data acquisition clock is synchronized with the data waveform to within the capture range of the maintenance CDR loop. The CDR maintenance module 118 can be a single clock system that has minimal low power components and can fine tune the data acquisition timing after preliminary timing recovery is achieved by the CDR acquisition module 116. In this embodiment, considerable power can be saved over traditional CDR systems since the CDR acquisition module 116 only operates for short periods of time, possibly only a few milliseconds during an initial system power up.

Figure 2:
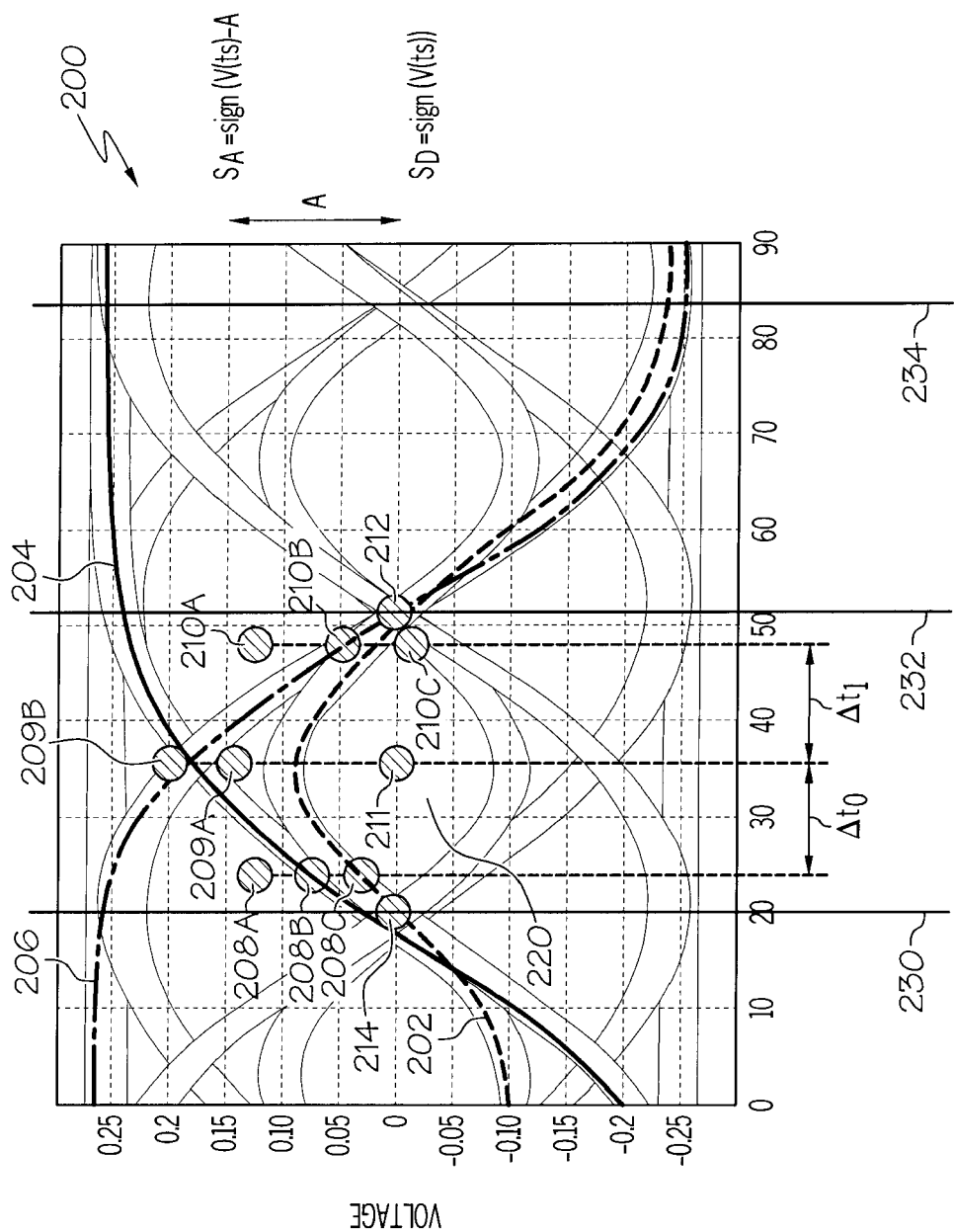
FIG. 2 depicts a graph of data waveforms that produce eye patterns and possible sampling points.

Referring to FIG. 2, a graph 200 of superimposed data waveforms or data stream cycles are illustrated. More particularly, three different data waveforms 202, 204 and 206 that represent different sequential bit patterns are emphasized on the graph 200. Waveform 202, illustrated by a short dashed line, provides a bit pattern acquisition of "0-1-0-0" as illustrated by acquired bit pattern 212, directly below the graph 200. It can be appreciated that the location of the bits in the acquired data section are directly below, and a representation of, the bit pattern provided by the waveform in the graph 200 at each time interval or bit cycle defined generally, by the vertical lines 230, 232 and 234 in the chart.

Waveform 204 is illustrated by a continuous line, and provides a bit pattern transmission of "0-1-1-1" as illustrated by bit pattern 214. Waveform 206 is illustrated by long dashed line segments and represents the bit pattern transmission of "1-1-0-0" as illustrated by bit pattern 216. Accordingly, the data waveforms have a bit cycle or bit reading time period (approximately 22 nanoseconds on the graph) and sometime during the bit cycle the receiver can sample the waveform to acquire the value of each bit. However, there is arguably a "best" time to sample the waveform and acquire the bit. One key to receiver synchronization is to determine an optimum time during the bit cycle to read the value (voltage) provided by the waveform. This determination can be utilized to modify a time when the data sampling clock triggers or clocks a latch to read such data.

In accordance with the single clock module/system of the present disclosure, a small transition is defined by bit patterns such as 0-1-0 and 1-0-1 (a sequential toggling of the waveform to alternate states) where large data transitions are defined by sequential bit patterns such as 0-1-1, 1-1-0, 0-0-1 or 1-0-0 where two logic highs or two logic lows are transmitted sequentially. It can be appreciated that the illustrated waveforms including waveforms 202, 204, and 206 exhibit different maximum values, minimum values, and transition points at the input of the receiver.

For example, it can be appreciated that a small transition shown by waveform 202 never reaches the desired maximum voltage because the signal is changing too quickly for the waveform to reach such a value. Conversely, large transitions such as those shown by waveforms 204 and 206 can reach their maximum or minimum values, (here, + or −0.25 volts), and the waveform can stay at such value until the data under transmission requires the waveform to transition to an opposite state. It can be appreciated that the example waveforms provided by FIG. 2 are intended to be illustrative only, as it may not be the case that the signal for all large transition patterns will reach the desired maximum or minimum signaling voltages.

An eye pattern 220 is illustrated, where the eye has a center 211. Twelve exemplary time-amplitude sample points 208A, 208B, 208C, 209A, 209B, 209C, 210A, 210B, 210C, 211, 212 and 214 are also illustrated on the graph 200. Generally, sample points 211, 212 and 214 are places where traditional multi-clock CDR systems sample an incoming waveform once data lock has been achieved. In accordance with the present disclosure, the CDR acquisition module would serve to create an accurate data acquisition clock for initial clock and data recovery on the waveform.

Sample points 208A, 208B, 208C, 209A, 209B, 209C, 210A, 210B, and 210C, are sample points that can be utilized by the single clock CDR maintenance system to fine tune and maintain the data acquisition clock. Generally, a fast clock recovery on start-up can be achieved by determining where a cross over of the differential data signals exists. The crossover can be defined as a point where a logic high differential signal transitions low at the same time a logic low signal transitions high where the voltage of the signals is equal, as illustrated generally concurrent with sample times 214 and 212. Thus, to achieve a quick data lock, a CDR acquisition module can utilize multiple clocks and take multiple samples per cycle and when the crossover points are located then the center of the eye pattern 211 can be located as half way between the crossovers 212 and 214. This technique works for quick acquisition of an acceptable but often not optimal data recovery clock because the eye pattern 220 can be skewed between the crossover points.

Accordingly, a single clock system can acquire data at sample times and amplitudes 208A, 208B, 208C, 209A, 209B, 209C, 210A, 210B, and 210C, over many bit cycles. These samples are taken at different locations on rising and falling edges of the waveform between the center of the eye pattern 220, and the crossovers. When samples are taken at these locations, phenomena such as a distorted eye can be detected possibly over hundreds of cycles and such samples can be utilized to fine tune the data acquisition clock for improved CDR performance in a maintenance mode.

The single clock maintenance module can provide a sampling clock that fine tunes the receive process by implementing many different sampling routines or sampling procedures or processes. Three different types of test routines are illustrated in graph 200. In a first embodiment, time-amplitude samples 209A, 209B and 211 are part of a first distinct test routine where the time-amplitude samples are taken at a single, specific time, namely, concurrently with what is perceived as the center of the eye pattern 211.

In a second distinct test routine, samples can be taken at three different times during a bit cycle. A first sample time can occur during a rising edge of a 0-1-1 transition, such as at t0 before the center of the eye 211, a second sample time can occur concurrently with the center of the eye 211, and a third sample time can occur at a time t1, after the center of the eye 211.

In a third test routine, samples are taken at least at the crossovers such that the timing of each cycle can be determined.

In the "first" single sample time embodiment, time-amplitude samples such as samples 209A and 209B can be acquired concurrently with perceived occurrence of the center of the eye 211. Given the parameters of a system, the waveform associated with a particular bit pattern typically will not change much over time. Thus, if an eye pattern is stressed due to impedance mismatches at power up, this stressed eye pattern will remain relatively constant over time. As stated above, the sampling routing of the single clock module can continually alter where a test point is taken in subsequent identical bit patterns to identify where the edge of the waveform of a specific bit pattern is occurring. The test point can be altered by utilizing a voltage adder and different offset voltages concurrently with the center of the eye 211 to acquire at least an average time and voltage where the edge of the waveform occurs.

For example, to acquire sample point 209A, an amplitude sampling control loop can invoke an offset voltage such that the bit sample at 209A would acquire a logic high at test point 209A. It can be appreciated that test point 209A has a voltage that is less than the waveform edge voltage, and thus the bit acquired would be a logic one or a "hit." In a subsequent bit pattern the offset voltage can be raised by 0.05 volts and a test point such as 209B can be taken, and since the test point has a voltage that is greater than the waveform's voltage at the sample time, the bit acquired for the test sample would be a logic zero or a "miss."

Based on these results, the offset voltage could be altered or lowered to converge on the exact time-amplitude location of the waveform edge. A hit-miss, hit-miss sequence while varying the offset voltage a few hundredths of a volt in subsequent bit patterns can accurately locate and track the waveform edge. Thus, the testing routine could determine generally that the waveform edge has a specific voltage at a specific time and this information can be utilized to determine if the eye is stressed and how the sampling clock should be adjusted. In addition, the time when the time-amplitude sample is taken can be altered to determine the imaginary crossover point where the larger transitions 1-0-0 and 0-1-1 occur (which occurs in the graph 200 just below 209B or just above 209A). The predetermined time-amplitude test sample can generally be located by starting the sampling procedure at a percentage of the maximum peak to peak voltage excursion at a time commensurate with the center of the eye. In the illustrated graph 200, sixty percent (60%) of the peak excursion voltage is where the imaginary crossover will occur at the center of the eye.

It can be appreciated that some of the figures described herein are drawn depicting a single ended system to simplify the descriptions and provide a clearer presentation of the disclosed concepts. Further, the descriptions, teachings and drawings depicted herein of a single ended system can be applied to a differential system and the descriptions, teachings and drawings of a differential signal system can be applied to a single ended system even though some language may be inconsistent with a both embodiments. Further, different systems may require different hardware. For example, a differential implementation may require different and additional hardware such as at least two transmission lines, a differential transmitter, and a differential receiver or comparator possibly other hardware.

As mentioned above, a second embodiment or routine for acquiring useful time-amplitude samples can include acquiring three samples in bit cycle, a pre eye sample, a center eye sample, and a post eye sample. Time-amplitude samples 208A, 208B and 208C lead the center of the eye 211, and time-amplitude samples 210A, 210B and 210C lag the center of the eye 211. Samples 208A-C indicate samples taken at the same time with different offset voltages, where the samples 208A and 210A would acquire a logic zero and samples 208B, 208C, and 210B and 210C would acquire a logic one, as they successfully detect the waveform voltage. As with the first embodiment, the voltage can be varied such that the test points hit-miss, hit-miss, hit-miss to locate and track the edge of the waveform. Such a plurality of time-amplitude samples can be stored by the disclosed single clock data waveform sampling system.

As stated above, the single clock data waveform sampling system can store a single binary value indicating that a waveform has a specific voltage at a specific time (a successful time-amplitude test). In another embodiment the single clock sampling system could read and store a digital value having multiple bits (such as 4 bits) that reflects the magnitude of the analog voltage of the data waveform at a particular time. In other embodiments, the sampling could be done below the zero volt line (in the bottom half of the graph) and in yet other embodiments multiple samples, instead of just three samples, could be taken on either side of the incoming data waveform.

In one example, when a bit sequence of 1-1-0 occurs five times over a period of, for example, 100 bits, a time-amplitude sample from each of the five different intervals may be successful at some time-amplitude combinations (i.e. may record a hit or a logic one) and may be unsuccessful at other time-amplitude combinations. This data on the same bit pattern over a hundred bit interval can provide useful information such as a "trend" that the data waveform is leading or lagging the center of the eye pattern 211. This information could then be used to adjust the timing of the data sampling operation, closing the CDR loop. Such a single clock method can be accomplished with a fraction of the power consumption of traditional CDR circuits and methods that can achieve a faster lock.

It has been determined that time-amplitude sampling of specific bit patterns with a single clock, such as a pattern having large transitions including those illustrated by waveforms 202 and 206, can provide timing recovery information that can be utilized to "fine tune" or modify the sampling clock timing and achieve improved performance. Modifying the timing of the sampling clock can provide improved data error rates for a communication system, while the single clock system can significantly reduce the power consumption of the receiver. Time-amplitude samples may be taken on every bit or less frequently, such as every hundred bits. Regardless of sampling frequency, the teachings of the present disclosure can reduce the number of clocks, clock generators and clock transitions required to maintain the CDR in a data locked condition. Thus, the disclosed system and arrangements can provide a CDR system with reduced overall power consumption.

The single clock low power hardware may be idle during a start up procedure and when the start up procedure is completed, the single clock low power system can be implemented to continuously adjust the sampling clock to provide a significant improvement in the error rate while greatly reducing the power consumption and circuitry required to achieve such improvement. The waveform parameters as determined by the sampling data can be utilized to provide a sampling clock trigger to a receiver such that the receiver can read the data from a data waveform at an "ideal" or "preferred" time.

In another embodiment the waveform sampling clock at t0 can be advanced (or moved to the left on the graph 200) or delayed until a successful hit occurs and likewise t1 can be advanced or retarded to locate the waveform edge. This time control can be accomplished by controlling a delay module that provides a delay of the waveform sampling clock.

In one configuration, a single clock generated by a delay module can be delayed by various delay gates to generate additional waveform sampling clock signals without requiring another complete, high power, clock distribution infrastructure. Such types of signals can provide the timing for 208A-C, and 210A-C data acquisitions. These clock signals can be utilized to sample the waveform and provide a "bracket" of data for a particular three bit sequence. As illustrated, the spacing between the three clock signals can be a small fraction of the bit cycle. For example, the time between the signals may be on the order of a few picoseconds.

Likewise, the data sampling signal can provide a synchronous data clock signal that can be shifted a few picoseconds from the center of the eye 211 based on a detected trend that the large transitions lead the center of the eye pattern. Alternately, when a trend is detected that large transitions lag the center of the eye the sampling clock can be adjusted to correct this sub-optimal sampling position. When data is being received at very high speeds, fine-tuning the sampling clock a few Pico-seconds before the center of the eye or after the center of the eye can make a substantial difference in the data error rate.

Generally, utilizing a starting sampling sequence, the sampling routine can be controlled by control loops such that the time-amplitude samples converge to acquire precise waveform data. Such operation of the control loop is further described below with reference to FIG. 3 below and with respect to Table 1 and Table 2 below.

Figure 3:
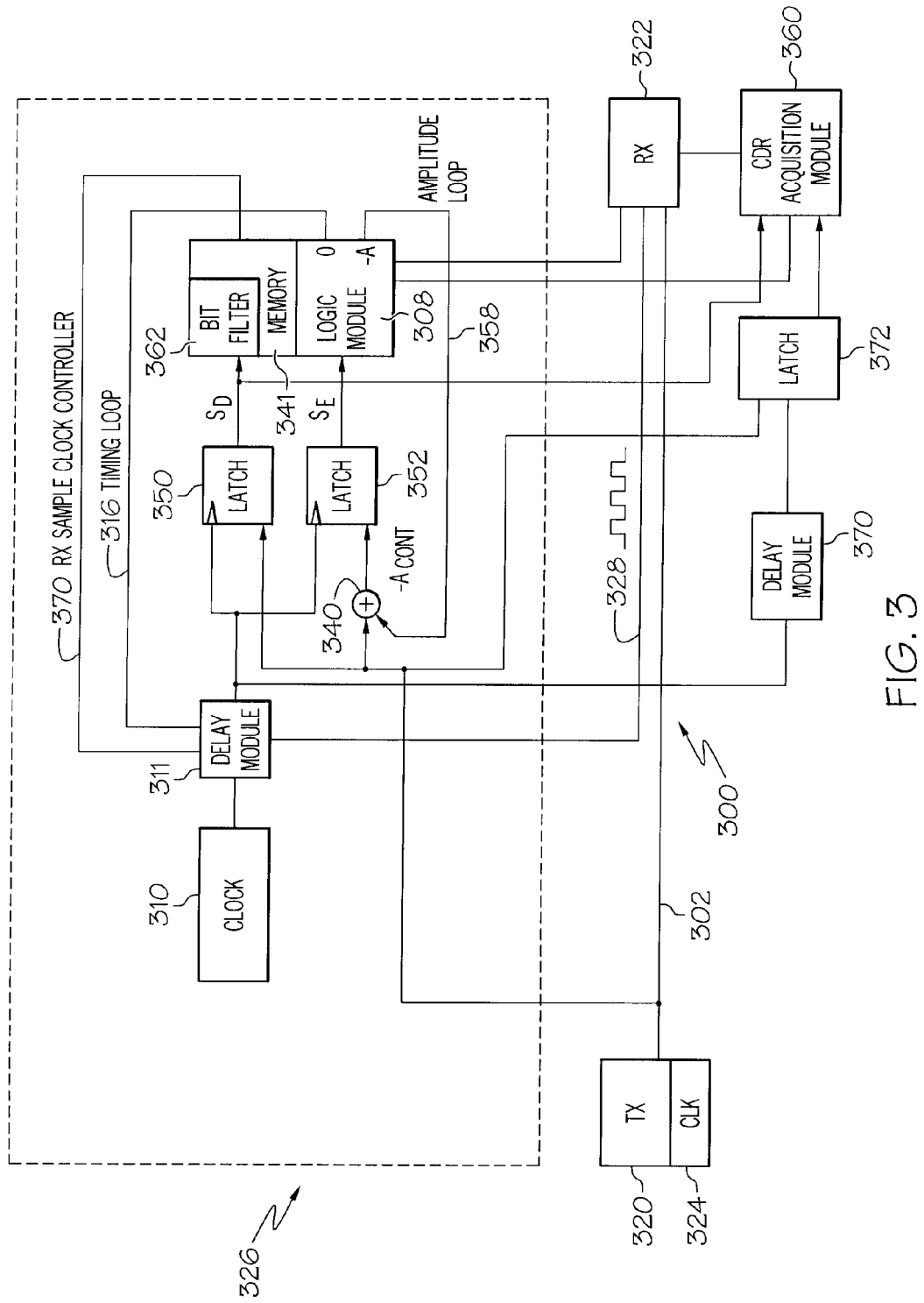
FIG. 3 illustrates a block diagram of a dual mode CDR system.

Referring to FIG. 3, a dual mode CDR system 300 is disclosed. Generally, the delay module 370 and latch 372 can be exclusively part of a CDR acquisition module and the balance of the components can be part of a CDR maintenance module as described with reference to FIG. 2 above. Thus, delay module 370 and latch 372 can be utilized to provide a fast clock/data lock on incoming data in start up mode and then the delay module 370, the latch 372 and a good portion of the clock circuitry can be shut down or turned off after data lock is achieved as the system is put into a maintenance mode where the data lock is maintained under low power conditions.

In the acquisition mode a fast lock acquisition can be achieved by the clock 310, delay modules 311 and 370, and latch 372 in a manner similar to conventional oversampling receivers. Delay module 370 and latch 372 can provide samples (such as samples 212 in FIG. 2) at the edge transitions of the data waveform. The delay module 370 can output a sampling clock which is timed half a bit cycle after the clock produced by delay module 311. Together with the data samples acquired by latch 350, a conventional clock algorithm can be utilized to achieve the initial lock. After lock is achieved, power can be removed from delay module 370 and latch 372 such that they do not consume any power. Hence, during lock acquisition, the CDR acquisition module 360 can accept the data samples SD from latch 350 and edge samples SE from latch 372, and control the timing of delay modules 311 and 370 to achieve oversampling and a quick analysis of the timing of the data waveform. In such an acquisition mode, the CDR acquisition module 360 can override the timing control loop signal on line 316 via the logic module 308. After the system switches from the data acquisition mode to the maintenance mode, the logic module 308 can control the timing control loop to create sampling point timing in accordance with a maintenance mode.

As stated above, components other than delay module 370, 372 and 360 can create a single clock CDR maintenance system that can enable operation during a maintenance mode. This portion of the system can operate on a single clock input because the system does not require a data waveform crossover detection system, an eye center sampling system or oversampling as in traditional CDR systems or in the quick lock system described.

The maintenance portion of the system 300 can include a transmitter 320 with a clock 324 that sends data over transmission medium 302 to receiver 322. The transmission medium could be an impedance matched circuit trace, coax fiber optics, copper cables or any other known conduit for data. A data waveform sampler/synchronizer (DWSS) 326, within the dashed block region, can monitor the bit patterns and waveform data that are present on the transmission line 302. Based on the bit pattern and acquired waveform data, the DWSS 326 can provide an accurate data sampling clock signal 328 to the receiver 322.

The DWSS 326 can include clock 310, delay module 311, latch 350, and latch 352, memory 341, logic module 308, bit filter 362, and an offset module such as an adder 340. In accordance with the present disclosure, a system, apparatus and method are disclosed that can utilize a single clock signal from the clock 310 to provide an accurate data sampling clock 328 that will synchronize the receiver 322 with the data waveform. The DWSS 326 can also determine many other parameters of the data waveform. For example, the DWSS 326 can determine the center of the eye pattern of the waveform based on sampling the amplitude of various bit patterns and the DWSS 326 can acquire attributes or parameters of the data waveform such as the timing and location of maxima, minima, crossovers and other information regarding the input signal can be determined. Such information can be utilized to adjust the sampling clock, control the testing pattern and control the operation of the system generally.

In one embodiment, only two latches, latch 350 and latch 352, are required to tune the data sampling clock 328. In the two latch embodiment, latches 350 and 352 can acquire time-amplitude samples of the data waveform on the transmission line 302. In this embodiment, the time-amplitude sample data can again be binary (hit or miss), indicating whether the data waveform is above or below a specific voltage as determined by an offset voltage provided to the adder 340 via amplitude control loop 358 and at a specific time as determined by a time delay signal provided to the delay module 311 via the timing control loop 316.

During operation of the two latch embodiment, latch 352 can acquire the time-amplitude samples at different times and voltages (locations on the graph) responsive to a waveform sampling clock provided by the delay module 311, and an offset voltage provided by the adder 340. If the waveform voltage, minus the offset voltage on the amplitude loop 358 is sufficiently high upon the arrival of the appropriate edge of the clock input provided by the delay module 311 at the input of the latch 352, the output of the latch 352 will provide a logic one on its output. Similarly, if the waveform voltage minus the offset voltage is not sufficiently high, the latch 352 will provide a logic low on its output. As stated above the timing and the offset can be continuously adjusted to converge on the edge of the waveform or to "dance" on and off the waveform edge when it is located to continuously monitor movement (if any) of the edge of the waveform.

The delay module 311 under the control of the logic module 308 and via timing loop 316 can provide various adjustable time delays to clock the sample into each latch 350-354. The adder 340 can be controlled by the logic module 308 via amplitude loop 358 such that various waveform voltages can be sampled.

As stated above, the time-amplitude samples become more valuable when they can be associated with bit patterns such as large transitions. Thus, latch 350 can acquire the binary data provided by the waveform on transmission line. Accordingly, data acquisition by latch 350 can be triggered by the waveform sampling clock from the delay module 311. Latch 350 can acquire serial binary data from the waveform on the transmission line 302 and can send the acquired serial binary sequences to the bit filter 362. The bit filter 362 can detect the occurrence of specific bit patterns such as specific large transitions.

After the bit pattern filter 362 detects specific, predetermined bit patterns, such as a 1-0-0 pattern, the logic module 308 can retrieve the time-amplitude samples associated with the 1-0-0 pattern from memory 341 and utilize such data to control the delay module 311 via control line 370 to improve the timing of the data sampling clock 328. In one embodiment, the logic module 308 can utilize combinational logic to modify the control loops 316 and 358 for improved time-amplitude data and can modify the data sampling clock via control line 370 based on the acquired time-amplitude data.

More specifically, the DWSS 326 can identify specific bit patterns and based on identified bit patterns and waveform time-amplitude data, the DWSS 326 can determine how the sample clock timing should be adjusted Based on the amplitude and timing of these waveforms, the logic module can control the delay module 311 that can provide the sampling clock signal 328 to receiver 322, allowing receiver 322 to accurately receive the data from the transmitter 320. Traditional low cost logic gates and registers can be utilized to implement the disclosed system.

In one embodiment, time-amplitude samples can be analyzed based on the reception of a specific three bit pattern such as the bit pattern 0-0-1 or 1-1-0 by the bit filter 362. The timing control loop 316 can alter the timing that dictates when the sample is taken and the amplitude loop 358 can alter the test level for the amplitude portion of the time-amplitude sample. For example, when three different 1-1-0 bit sequences occur over a period, of say 100 bits, a single sample from each of the three different intervals may be utilized to reveal useful information regarding the data waveform. Such useful information may include when in relation to the sampling clock the data waveform transitions are occurring and the slope or shape of the transition of the data waveform.

The bit pattern filter 362 can filter bit patterns, allowing the system to ignore data acquired during small transitions and to suppress sample acquisition control loops. Small transitions typically do not reveal significant data about lead and lag phenomena and waveform transition trends. More particularly, such an analysis on small transitions typically does not reveal if the sampling clock is too late or too early with relationship to the waveform transitions, or whether performance can be improved with a timing adjustment. Generally, comparing the small-transition waveform with the large transition waveforms it can be appreciated that a small-transition rises and falls in one bit cycle. Hence, it is difficult to determine the direction that the sample timing should be moved for improved data reception.

The decision to advance or retard the sampling clock (or the exact time to acquire the data from the transmission line) can be determined based on the detected "location" of rising and falling edges of the data waveform. The timing loop 316, phase tracking loop, or sample clock timing modification loop as it may be called, that can control the sampling clock signal 328 can be relatively slow and does not control the delay module 311 on a "bit-by-bit" basis. The timing loop 316 can act as more of a correction for long term "trends" or long term drift of the waveform timing. Accordingly, when a large transition is identified by the processing logic 308, the time-amplitude samples of this identified waveform can be evaluated to determine if a "long term" sampling clock modification solution should be implemented.

Typically, the large transitions will provide a better waveform for timing analysis because they have a higher voltage swing and more predictable curves or slopes. Therefore, it is easier to acquire accurate data during such large transitions because the "side" of the waveform transition where accurate data can be acquired is easier to determine. In addition, data acquisition proximate to larger transitions benefits more from fine tuning of the clock sampling signal than does CDR sampling acquisition proximate to smaller transitions. Waveforms that have large transitions generally provide more data points regarding whether the sample clock is too early or too late.

As stated above, the timing of the sampling clock can be fine tuned, but the tuning (advancement or retardation) of the sampling clock does not have to be done on a "bit-per-bit" basis and can be done in response to trends that span hundreds of bits. This is because timing variations in the transmitted data may occur quite slowly with respect to the bit speed or signal transitions that create the incoming data, as in, for example, clock forwarded systems or systems in which the transmitter and receiver share a reference clock. Thus, the receiver 322 can track the timing of the incoming data with a relatively slow phase tracking loop 316.

From the reception of one bit to the next, the sampling clock 328 or timing provided to the receiver 322 may not change significantly. In response to the output of the logic module 308, the phase tracking or timing loop 316 and the position or setting of the delay module 311 can change relatively slowly over the course of receiving a series of bits or bit patterns. For example, the delay module 311 may advance or retard the sample clock one Pico-second or one increment for every 100 signal transitions or bits received.

This relatively slow correction, or control loop response is acceptable to account for the variations caused by chances in temperature and in hardware properties such as the channel variations, circuit variations and also for small frequency offsets (i.e. <0.02%) because such variations typically do not change dynamically at a rate that is on the order of the data rate. It can be appreciated that the electrical properties of each individual channel both within a system and across multiple instances of a system will vary due to local impedance mismatches, parasitic capacitances in the circuit, variations in transmission line length, and variations in transmission line impedance characteristics, and many of these instances can be further affected by manufacturing variations, temperature changes, and supply voltage movement. A slow control loop can correct these predominantly "static" or low frequency variations, non-idealities and/or deficiencies to improve the communication link based on "long term" corrections or a long term solution.

In yet another embodiment instead of a latch, an analog to digital converter (not shown) could accept the waveform upon the clock signal and convert the waveform voltage to a digital value and provide the digital data to the memory 341 as a multi-bit word such that the logic module 308 could utilize a more exact representation of the exact waveform value in the computing performed by its control loops and setting the timing of the data sampling signal 328. In another embodiment, the logic module 308 can generate a digital signal that controls adder 340, such that adder 340 can either boost ($A_{up}$), or attenuate ($A_{down}$) the offset voltage A to adjust the amplitude test point for the timed test sample.

The time-amplitude testing or test routine provided by the logic module 308 can be based on a predetermined or learned routine that can acquire a plurality of strategically located time-amplitude samples of the data waveform. Time-amplitude sampling can be conducted in many ways depending on what data is desired. Above two embodiments are provided in detail. One way to implement the testing routine that is described above with the three sample points (218X, 211 and 210X) is provided below in Table 1.

Referring to Table 1 below, the $A_{up}$ and $A_{down}$ signals on the amplitude control loop 358 can be generated based on the results of the $A_{down}$ pattern filter 362 performing bit pattern filtering. More specifically, in Table 1 the control loops are adjusted based on a detection of large transitions by the bit pattern filter 362. The amplitude adjustment signal can be filtered within the logic module 308 by a low-pass filter to remove any quick response of the signal in the control loop. The digital value of the amplitude control signal ($A_{up}$ and $A_{down}$) can be incremented or decremented and the digital value can be provided to a digital to analog converter (not shown) either in the logic module 308 or in the adder 344 such that the adder 344 can add or subtract the analog voltage that is utilized to sample the data waveform voltage.

The time-amplitude analysis of the present disclosure can also be utilized to detect or acquire additional parameters and attributes of the data waveforms by modifying the sampling process. For example, the logic module can determine the center of an eye pattern of data waveforms and reveal minima, maxima and average values of the data waveform. The logic module can also identify a trend of leading or lagging waveforms, can measure the distortion of the eye and can identify the locations of crossovers of the differential data waveform. The detected attributes can be utilized to continually optimize the sample clock timing. Thus, the timing of the receiver can be continually tuned or adjusted based on time-amplitude samples obtained from waveforms with known bit patterns.

As illustrated, the output of latch 350 can provide an $S_D$ output which is, generally, a signal representing the voltage at the center of the eye pattern when the sampling clock reads the data waveform, where $S_D$=sign (V(ts)). Likewise, the output of latch 352 can provide an $S_A$ output where $S_A$=sign (V(ts)–A) where A is the amplitude of the control loop and A is a "reference voltage" that can be subtracted from the waveform voltage at the sample time by the adder 340. Accordingly, output of the latch 352 can provide the amplitude portion of the time-amplitude sample. (See the right margin of graph 200 in FIG. 2)

SDn−1 in row 1 column 2 indicates a first bit in a sequence of three bits for the bit pattern filter, $SD_n$ indicates a second bit in the progression and SDn+1 indicates a third bit in this succession. $SA_n$ represents a time-amplitude sample taken proximate to the $SD_n$ sample. $SA_n$ may lead or lag the $SD_n$ time-voltage depending on the pre-eye/post-eye sample control timing-voltage. Column $SA_n$ indicates a sample taken during the interval which the a logic one was read during a $SD_n$ time period where $SD_n$ is part of a large transition, and the discussion below is concerned with the situations where $SD_n$=1 in the middle of a large transition. Such cases appear on rows 8, 9, 14, and 15 of Table 1.

As stated above, the control loops 316 and 358 can be adjusted based on the time-amplitude samples for predetermined pattern(s) (i.e. large transitions) and modification of the signals on the control loops can be performed in accordance with controlling pre-eye center sampling when a "1" is captured by latch 352 in the pre eye column and controlling the post eye center sampling when the latch 352 acquires a "1" in a post eye center sample.

For the following discussion it may be helpful to refer back to FIG. 2. When a progression of bits 0-1-1 is detected by the pattern filter 362 and the time-amplitude (SAn) sample, as shown by eighth row of Table 1, does not detect a sufficient voltage on the transmission line, (i.e. records a zero) then the time-amplitude sample point is "above" the waveform and the logic module 308 can force the generation of a delayed or retarded sample time and a voltage value can be added to the offset amplitude ($A_{up}$) to increase the offset voltage by an appropriately chosen or predetermined voltage increment ΔA. Such control changes can be made in increments until $SA_n$ acquires a logic 1 which means that a point on the leading edge of the waveform has been located.

Thus, in Table 1 below a logic one in the amplitude loop control signals $A_{up}$ column can indicate increasing the offset voltage and a logic one in the $A_{down}$ column can indicate decreasing the offset voltage by a predetermined increment. In one embodiment the offset voltage system can be though of as a one bit digital to analog converter where the one bit will adjust the offset voltage a predetermined amount. Such changes or corrections to the tested amplitude level can be controlled in response to whether a successful sample was made, or was not made by the system according to comparing $SD_X$ to $SA_n$.

As discussed above, the $A_{up}$ and $A_{down}$ signal can be fed to the adder 340 and the pre eye/post eye signal can be sent to the delay module 311. With regard to the description above regarding the eighth row it may be beneficial to refer to rising waveform 204 of FIG. 2 which illustrates a 0-1-1 bit pattern and sampling point 208 which occurs before the center of the eye. In the eighth row, since the waveform is rising and $SA_n$ did not detect a voltage or a logical one, (it is a "0" in Table 1) before the center of the eye, the time-amplitude sample has been taken too early and/or at too high of a voltage to detect the edge of the waveform. Thus, the control loops can move the time-amplitude sample point closer to the waveform edge by decreasing the offset voltage and providing less offset voltage to the adder 340. The control loops can continue to move the time-amplitude sample point until the logic module acquires a logical 1 for the $SA_n$ value and then as illustrated in row 9 the time-amplitude sample can move away from the edge such that the sampling "dances" on and off the edge of the waveform for subsequent identical bit patterns. Sampling "on the edge," "off the edge," and "on the edge" can first detect the location of the transitioning edge and then track any movement of the edge of the waveform over time.

Another example is illustrated in row 14 of Table 1, in which a falling edge is occurring such as one created by a 1-1-0 progression, and the sample data $SA_n$ does acquire a logical 1 in a pre eye, time-amplitude sample as indicated by the "1" under $SA_n$ in row 14. To locate the edge of the waveform (such as the waveform illustrated by waveform 206 in FIG. 2), the sampling process can be performed at an earlier time or with an increased offset voltage, ultimately resulting in $SA_n$ switching to or acquiring a logic zero as in row 15 where the control points can change direction.

These two examples show how simple combinational logic could be utilized to control at least one feedback loop to determine with great accuracy where the rising and falling edges of waveforms containing large transitions are occurring. In the example, the combinational logic of the logic module 308 and the bit pattern filter 362 only generates non-zero signals (or changes the control loop operating points) for the large bit patterns where $SD_n$ is a logical 1 as illustrated in rows 8, 9, 14, and 15 of Table 1.

As illustrated in row eight, a 0-1-1 progression of bits creating a time-amplitude sample of 1 can facilitate the logic module 308 to generate an "early" or "pre-center" sample and to decrease the amplitude of the data waveform minus offset voltage by a specific voltage. The generated "early" and "late" signals, after being low-pass filtered by the logic module 308 can control the operation of the delay module 311.

TABLE 1

| Row 1 | $SD_{n-1}$ | $SD_n$ | $SD_{n+1}$ | $SA_n$ | Pre eye | Post eye | $A_{up}$ | $A_{down}$ |
|---|---|---|---|---|---|---|---|---|
| 2 | 0 | 0 | 0 | 0 | | | | |
| 3 | 0 | 0 | 0 | 1 | | | | |
| 4 | 0 | 0 | 1 | 0 | | | | |
| 5 | 0 | 0 | 1 | 1 | | | | |
| 6 | 0 | 1 | 0 | 0 | | | | |
| 7 | 0 | 1 | 0 | 1 | | | | |
| 8 | 0 | 1 | 1 | 0 | 1 | 0 | 1 | 0 |
| 9 | 0 | 1 | 1 | 1 | 0 | 1 | 0 | 1 |
| 10 | 1 | 0 | 0 | 0 | | | | |
| 11 | 1 | 0 | 0 | 1 | | | | |
| 12 | 1 | 0 | 1 | 0 | | | | |
| 13 | 1 | 0 | 1 | 1 | | | | |
| 14 | 1 | 1 | 0 | 0 | 0 | 1 | 1 | 0 |
| 15 | 1 | 1 | 0 | 1 | 1 | 0 | 0 | 1 |
| 16 | 1 | 1 | 1 | 0 | | | | |
| 17 | 1 | 1 | 1 | 1 | | | | |

When the progression of bits or received bit sequence is 1-1-0-0, as shown in the thirteenth row of Table 1, then the logic module 308 can force the generation of a post eye center sample with an increased offset voltage to increase the voltage portion of the time-amplitude sample point. As illustrated in row fourteen, when a 1-1-0-1 progression of bits occurs this can cause the logic module 308 to generate a pre eye center signal, and to decrease the offset voltage by an increment or a specific voltage. As stated above, these adjustments can be an adjustment made relatively slowly during a time period where hundreds of bits are received by the receiver.

The logic module 308 can provide a low-pass filter for the loop signals pre-eye and post-eye (or "early" and "late") that are sent by the logic module 308 to the delay module 311 over the timing loop 316. Such a signal can adjust the phase of the waveform sampling clock provided to the latch inputs via the delay module 311. The delay module 311 can move the position of the early and late timing signals as desired to achieve additional accuracy.

It can be appreciated that there is only one clock delay module 311 and the system 300 can operate with low power and minimal area on an integrated circuit. The system 300 provides an architecture that has at least two feedback loops running in parallel 316 and 358. These loops can dictate when, and at what voltage offset the samples are taken. The sampling phase loop 316 can fine tune the sample timing and the amplitude loop 358 can fine tune the amplitude thresholds of the data waveform samples.

Many traditional differential data receivers synchronize the sample clock on a determination of the crossing point of the data signal with the complementary data signal. This crossing point is usually near zero volts. It can be acceptable to assume that the data signal and complementary data signal are symmetric and that the crossing point of these signals is spaced half a period away from the center of the eye pattern. Since the present disclosure utilizes large transitions to modify the sampling clock, the logic module 308 may assume that the center of the eye pattern is halfway between consecutive crossings when a 0-1-0 or a 1-0-1 bit pattern occurs.

Table 2 below is another possible signal table for pre eye center/post eye center or early/late and $A_{up}/A_{down}$ signal generation for the control loop provided by the logic module 308. The routine provided by Table 2 is based on a bit error rate embodiment that takes three samples as was discussed in the second sampling embodiment of FIG. 2. S1 indicates a time-amplitude sample that is taken first in time, sample S2n indicates a sample that is taken second in time and S3n is a sample taken third in time much like the samples 208X, 209X and 210X in FIG. 2. Table 2 illustrates how, in one embodiment the bit pattern filter 362 can generate non-zero output signals for rows 3, 4, 7 and 8.

Accordingly, it can be appreciated that control loops may only be active when S2=1 as illustrated by 209 in FIG. 2 for large transitions. The logic module 308 can dictate whether the time-amplitude clock signal will precede the center of the eye, or whether the sampling clock signal will occur after the center of the eye pattern according to the "early" "late" columns of Table 2. The logic module 308 can provide low-pass filtering on the early/late signal that results in improved up/down signals to modulate the delay module 311.

The logic module 308 can provide the amplitude adjustment signal ($A_{up}/A_{down}$) in accordance with matching the bit patterns as described by Table 1 and the logic module 308 can provide a low-pass filter operation on the amplitude adjustment signal to remove noise and other high frequency harmonics that may result from switching devices. Further, logic module 308 can increment and decrement the digital amplitude control value $A_{up}$ and $A_{down}$. This digital amplitude value could be supplied to an analog to digital converter to achieve an analog output to supply the adder 340. In general, $A_{up}$ and $A_{down}$ can be controlled asymmetrically, meaning that the number of $A_{up}$ and $A_{down}$ increments applied by the loop need not match. For example, the amplitude increase signal may increment many more times than does the amplitude decrease signal in the course of locating the waveform edge.

The control criteria in Table 2 can correspond to setting the amplitude control utilizing a bit-error rate criterion. A bit error may be indicated in considering the time-amplitude pairs in the left and right bracket samples S1, S3, respectively, (for example 208A and 210A in FIG. 2), along with the data sample S2. Specifically, when the bit value of the voltage-shifted samples S1 and S3 differ from the data sample acquired by S2 (illustrated by 209A in FIG. 2), an error is indicated. It can be appreciated by looking at FIG. 2 that increasing the control amplitude or offset voltage in the amplitude control loop can lead to higher bit error rates for the S1, S3 samples. Thus when the S1, S2, S3 respectively acquire a 0-1-0 pattern (in line 3) the voltage offset can be increased until a bit error occurs on one side of the center or the other and this can indicate when the large transitions are leading or lagging the center of the eye. The timing of the time-amplitude sample that has the error can be modified to locate the waveform edge.

In one embodiment the control loop can regulate the amplitude of the offsets associated with the first and third samples such that the bit error rate can be maintained at a predetermined given value, for example $10^{-3}$. To detect the bit error rate, a standard bit error rate routine could be utilized. A sample point slightly above the center of the eye 211 could be utilized to determine the actual bit value and this value could be compared to the time-offset/voltage-offset samples acquired on each side of the center of the eye to provide a bit error rate. A setting of the voltage offset for S1 and S3 that has an acceptable amount of successes will detect "where" the edge of the waveform is located in time and amplitude.

It can be appreciated that using the described bit error rate criterion applied on a stressed eye pattern (an eye pattern possibly shifted in voltage and amplitude) the system can effectively place the sampling clock transition or trigger at the optimum sampling point in the bit cycle. It can be appreciated that this feature is not present in traditional two clock receivers that even utilize more than two samples per bit cycle to recover the timing.

TABLE 2

| Row 1 | $S1_n$ | $S2_n$ | $S3_n$ | early | Late | $A_{up}$ | $A_{down}$ |
|---|---|---|---|---|---|---|---|
| 2 | 0 | 0 | 0 | | | | |
| 3 | 0 | 0 | 1 | | | | |
| 4 | 0 | 1 | 0 | | | 1 | |
| 5 | 0 | 1 | 1 | | 1 | | |
| 6 | 1 | 0 | 0 | | | | |
| 7 | 1 | 0 | 1 | | | | |
| 8 | 1 | 1 | 0 | 1 | | | |
| 9 | 1 | 1 | 1 | | | | 1 |

Figure 4:
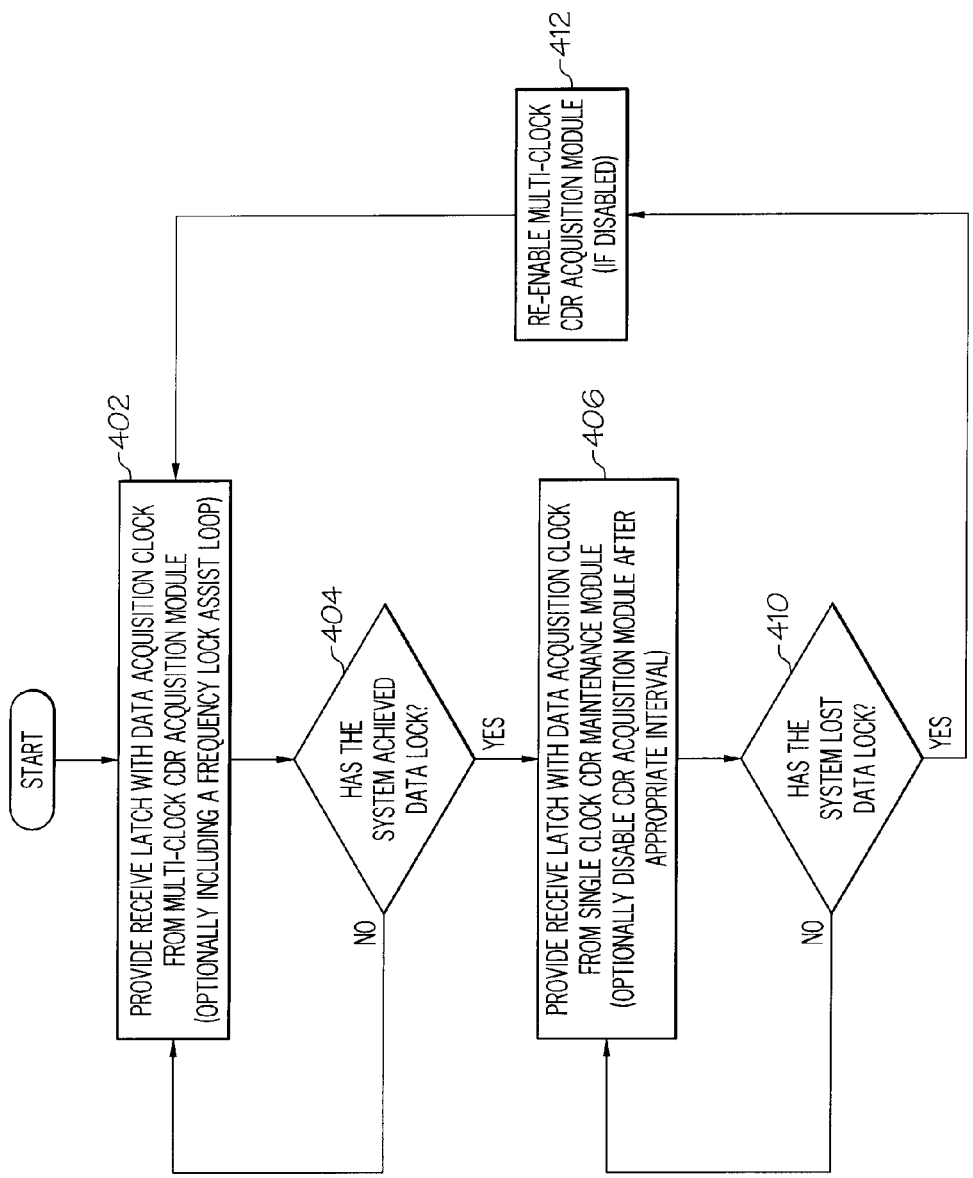
FIG. 4 depicts a flow diagram of a method for clock and data recovery.

Referring to FIG. 4, a flow diagram of a method for a dual mode CDR system is disclosed. As illustrated by block 402 a receiving component such as a receiving latch can be provided with a data acquisition clock from a multi-clock CDR acquisition module. The multi-clock CDR acquisition module can have a secondary frequency acquisition loop to improve its acquisition performance. As illustrated by decision block 404, it can be determined if a system indicator, indicates that a data lock on the incoming data waveform has been achieved. The term data lock is utilized loosely herein, to indicate that the data acquisition clock has at least some synchronization with the data waveform such that at least some data can be recovered from the incoming data stream or that provides some indication of system stability.

The indicator can be from a loop voltage, a bit error detector or any other system feature that can provide an indication of some form of system stability. In other embodiments a timer counting for a predetermined amount of clock cycles or counting in real time can provide the indication based a statistical basis of how long it takes most systems to lock under normal operating conditions. If the system has not achieved stability or a data lock then the process can revert back to block 402 where synchronization of the receiving latch with the data steam can be refined.

If the system has achieved some level of stability or a predetermine time period has elapsed, then the receiving latch can be provided with a data acquisition clock from a single clock maintenance CDR module as shown in block 406. The multi-clock CDR and indeed the entire hybrid CDR system could operate plesiochronously, where the transmitter transmits the data waveform at a "known" frequency and the receiver clock operates at a frequency within a small frequency offset of the transmitter clock's frequency.

In some embodiments the multi-clock CDR can achieve a data lock very quickly and although it may dissipate considerable power it may only operate for a few hundred nanoseconds. Then, the single clock low power CDR module 406 can take over, greatly reducing the power required to continuously operate the CDR system. The timer could also be utilized to deactivate the CDR acquisition module after the predetermined time interval.

As illustrated in optional decision block 410, if data lock is maintained, the system will continue to operate with its receive latch sample clock derived from the lower power maintenance CDR module. Should the system lose its lock or become unstable, the multi-clock acquisition module could be re-activated as illustrated by optional block 412. When this occurs the receive latch sample clock can once again be provided by the multi-clock acquisition CDR module as shown in block 402. It can be appreciated that throughout the operations described by the flow diagram, the active CDR module (acquisition or maintenance) can continuously fine tune or adjust the timing of the sampling clocks in an attempt to maintain and improve data lock. The flow chart illustrates a continuous process and the process could end when there is no data to receive.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the disclosed embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that can provide data sampling and clock and data recovery. It is understood that the form of the invention shown and described in the detailed description and the drawings are to be taken merely as examples. It is intended that the following claims be interpreted broadly to embrace all the variations of the example embodiments disclosed.

What is claimed is:

1. A method for receiving data comprising:
monitoring a receiver for indications of a data lock condition on receivable signal;
activating multi-clock-data recovery components in response to an unconfirmed data lock condition;
detecting the indications of the data lock condition;
switching to a clock and data recovery maintenance mode in response to detecting the indications of the data lock condition, wherein switching to the clock and data recovery maintenance mode comprises:
deactivating the multi-clock data recovery components and
adjusting a timing of a sampling clock signal for recovering the data from the receivable signal based upon analysis of time-amplitude samples associated with a sequence of bits in response to detection of the sequence of bits in the data recovered from the receivable signal; and
activating a multi-clock data recovery module and a single clock data recovery module concurrently for a predetermined time period; and synchronizing a data acquisition clock of the multi-clock data acquisition module with a data acquisition clock of the single clock module in response to an indicator that the multi-clock data acquisition components have achieved a predetermined level of stability.

2. The method of claim 1, further comprising activating a single clock data recovery components in response to the indications that a data lock has occurred.

3. The method of claim 2, further comprising idling components of the multi-clock data recovery module in response to the indications that the data lock has occurred.

4. The method of claim 1, further comprising activating components of the single clock data recovery module in response to the multi-clock data recovery components achieving a predetermined level of stability.

5. The method of claim 1, further comprising terminating operation of the multi-clock data recovery module in response to the single clock data recovery module achieving some level of data lock.

6. The method of claim 1, further comprising determining a data error rate of a received signal and basing the indicator on the data error rate.

7. The method of claim 6, further comprising determining the indicator based on the determined data error rate being lower than a predetermined data error rate.

8. A clock and data recovery apparatus comprising:
a clocked receiver component to receive at least one data sampling clock and a data waveform and to produce recovered data, the data waveform having cycles;

a multiphase clock-data acquisition module having a multiphase clock coupled to the clocked receiver component to provide the at least one data sampling clock to the clocked receiver based on sampling the data waveform at least two times during the waveform cycle;

a data lock detector to determine an indicator that a clock signal from the multiphase clock-data acquisition module is synchronized with the data waveform in accordance with a predetermined parameter;

a clock mode switch to deactivate at least a portion of the multiphase clock and provide a single data acquisition clock signal to the clocked receiver component for recovering the data from the data waveform, the deactivation based on the determined indicator; and a maintenance module to adjust a timing of the single data acquisition clock based upon analysis of time-amplitude samples associated with a sequence of bits in response to detection of the sequence of bits in the data recovered from the data waveform;

wherein the multiphase clock-data acquisition module and the maintenance module is activated concurrently for a predetermined time period and the at least one data sampling clock of the multiphase clock-data acquisition module is synchronized with the single data acquisition clock of the maintenance module in response to an indicator that the multiphase clock data acquisition module has achieved a predetermined level of stability.

9. The apparatus of claim 8, wherein deactivating at least a portion of the multiphase clock reduces the power consumption of the clock and data recovery apparatus.

10. The apparatus of claim 8, wherein the single data acquisition clock signal is generated by a portion of the multiphase clock that is not deactivated.

11. The apparatus of claim 8, wherein the maintenance module comprises an independent single clock module to provide the single data acquisition clock signal.

12. The apparatus of claim 11, wherein the maintenance module advances the timing of the single data acquisition clock signal based on the single clock module determining that the data waveform is advanced in time.

13. The apparatus of claim 11, wherein the maintenance module retards the timing of the single data acquisition clock signal based on the single clock module determining that the data waveform is lagging in time.

14. A clock and data recovery system comprising:
a transmitter to transmit data in a data waveform format;
a receiver having a first clock recovery module to receive data in the data waveform format and to generate a data acquisition clock signal in a start up acquisition mode, the data acquisition clock signal having a timing relationship with the data waveform, the receiver having a second clock recovery module to receive the data waveform in a power conservation mode and to generate a single clock data acquisition signal in the power conservation mode, the receiver to determine an indicator that the data acquisition clock signal from the first clock recovery module is synchronized with the data waveform in accordance with a predetermined parameter and to deactivate via a clock mode switch, at least a portion of a multiphase clock for the first clock recovery module and provide a single clock data acquisition signal for recovering the data from the data waveform, the deactivation based on the determined indicator, the second clock recovery module to adjust a timing of the single data acquisition signal based upon analysis of time-amplitude samples associated with a sequence of bits in response to detection of the sequence of bits in the data recovered from the data waveform, the first clock recovery module and the second clock recovery module being activated concurrently for a predetermined time period the receiver to synchronize the single clock data acquisition signal of the second clock recovery module with the data acquisition clock signal of the first clock recovery module in response to an indicator that the first clock recovery module has achieved a predetermined level of stability.

15. The system of claim 14 further comprising a data lock module to identify the start up acquisition mode and to switch the receiver to the power conservation mode.

16. The system of claim 14, wherein the second clock recovery module comprises a bit pattern filter to identify bit patterns of the data waveform comprising the sequence of bits and a logic module to acquire the time-amplitude samples and to generate a clock modification signal in response to detection of the sequence of bits and an analysis on the time-amplitude samples.

17. The system of claim 14 wherein the first clock recovery module samples the waveform at a crossover and the second clock recovery module samples the waveform at a waveform edge between a crossover and a center of an eye pattern.

* * * * *